United States Patent [19]

Fournel

[11] Patent Number: 5,009,255
[45] Date of Patent: Apr. 23, 1991

[54] VERSATILE STRUCTURE FOR ALL MACHINING WORK MAINLY ON SOFT MATERIALS

[76] Inventor: Paul Fournel, 12 Allee des Chênes, 42580 L'Etrat, France

[21] Appl. No.: 383,451

[22] Filed: Jul. 24, 1989

[30] Foreign Application Priority Data

Jul. 25, 1988 [FR] France ............................. 88 10342
Jul. 11, 1989 [FR] France ............................. 89 09661

[51] Int. Cl.⁵ ............................................. B27C 9/00
[52] U.S. Cl. ................................... 144/1 R; 29/26 A; 29/27 A; 144/35 R; 144/46; 144/286 A; 144/287; 144/144 R; 144/365
[58] Field of Search ................. 408/22, 24, 25, 30, 408/52; 29/26 A, 27 A; 144/1 R, 3 R, 35 R, 35 A, 144 R, 144 B, 154, 286 R, 286 A, 287, 46, 48, 365, 367

[56] References Cited

U.S. PATENT DOCUMENTS

| | | | |
|---|---|---|---|
| 2,465,000 | 3/1949 | Turner | 144/1 D |
| 3,771,579 | 11/1973 | Heuze | 144/1 G |
| 4,318,432 | 3/1982 | Howey | 144/1 C |
| 4,497,353 | 2/1985 | Sproat, Jr. | 144/1 C |
| 4,515,191 | 5/1985 | Fetty | 144/1 C |
| 4,598,744 | 7/1986 | Bons et al. | 144/1 H |
| 4,753,279 | 6/1988 | Harris | 144/287 |
| 4,787,127 | 11/1988 | Beall | 144/1 G |

Primary Examiner—W. Donald Bray
Attorney, Agent, or Firm—Eric P. Schellin

[57] ABSTRACT

A multi-purpose machine tool which can include and provides for drilling, sawing, shaping, planning functions, all mounted in a sturdy frame of parallelepiped shape.

7 Claims, 9 Drawing Sheets

VERSATILE STRUCTURE FOR ALL MACHINING WORK MAINLY ON SOFT MATERIALS

The invention relates to the technical sector of portable multi-purpose machine-tools.

Portable machines of the drill, saw, planing machine and motor blocks which can be adapted with specific accessories according to each machining operations are known.

Due to their special features, these portable machines cannot carry out varied machining operations as the one covered in the Canadian Patent No. 1,078,709 and U.S. Pat. No. 3,036,608, or otherwise the necessary accessories have to be purchased in order to transform them into a fixed station. However, this is tedious to implement with unreliable precision and sturdiness.

Furthermore, it proves difficult to transport of machines and their accessories to worksites for example considering the total weight and difference of the units.

Fixed machines combining several operations such as sawing-sanding, planing-straightening, turning-drilling are also known. These machines, like the one described in the French Patent No. 2,578,770, are bulky and heavy, therefore cannot be transported, and the cost involved to invest in the equipment and tooling is high for reduced use.

In order to overcome these disadvantages and also offer both professionals and individual do-it-yourselfers, a multi-purpose machine which is light, easily transported, quickly implemented and enabling all the conventional machining operations of soft materials to be carried out, the versatile structure according to the invention was designed.

According to a first characteristic, this structure is comprised of a sturdy frame of a general parallelepidedic shape which is fitted with sliding guide means and swivelling support means for a tool-holder and by a motor for rotating tools and with complementary guide, support and drive means for components and attachments enabling, in combination with the said motorised tools, several different machining operations on various materials, both with the frame in the vertical or horizontal position; the said frame also being fitted with manual transport means.

According to another characteristic, the frame comprises two parallel frames connected to one another at the bottom part by two fixed cross members and fitted with two removable cross members; the said frames having parallel slides in the middle in order to guide and move means associated to the tool-holder and drive motor.

Another characteristic can be found in the fact that the sliding guide and swivelling support means are made up of a saddle fixed to the slides and a rotary cross slide mounted on the saddle; the said slide supporting the tool-holder of the drive motor in an adjustable manner.

According to another characteristic, in order to enable the machining operations with vertical or horizontal motor centre line, the saddle is connected to a manual translatory drive connected to the frame.

Another characteristic is found in the fact that removable bars associated to the cross members in order to act as table extensions and a transport handle, take dismantable device(s) each comprising a crossed collar one of the openings of which is crossed by the aforementioned bar and the other by the longest leg of a square with a cylindrical cross section whose other leg is made up of a swivel pin for a roller retained by a screw and a washer; these devices associated either totally or partially to the said bars fixed at determined points of the structure or some of its equipment, fulfil various functions such as guides, extensions, supports, hold down devices, screw jacks, etc.

According to another characteristic implemented in order to improve the output during copying operations, the crossed slide is fitted with a device to mount the sensor applying a constant pressure on the profile of the pattern or template.

According to another characteristics implemented in order to improve safety, the circular saw mounted in a spindle at the end of an arm swivelling with respect to the crossed slide, is covered at the part projecting from the work table by a casing hinged to an indexing blade mounted on the arm supporting the tool-holder spindle in order to follow the swivelling movements of the saw.

These characteristics and others will become apparent from the following description.

In order to clarify the object of the invention, however, without limiting it, in the accompanying schematic drawings.

The object of the invention will become more apparent from the following non limiting detailed description when considered in conjunction with the examples of embodiments of the figures of the drawings.

Figure 2:
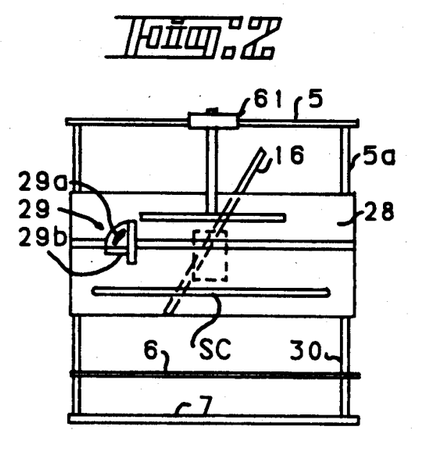
FIG. 2 is a plan view of the structure showing the top mobile cross members and the top table in particular, in the circular saw position and extended on either side.
Figure 3:
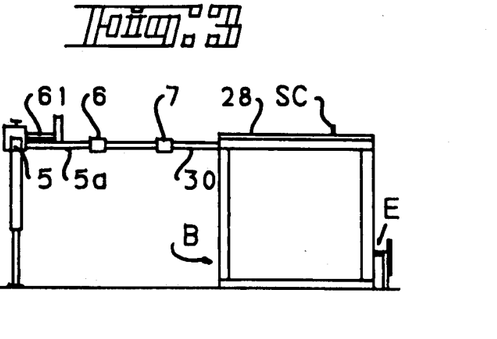
FIG. 3 is a profile view showing the maximum extension of one side.

The structure according to the invention comprises a frame (B) of a general parallelepipedic shape which is comprised of two parallel frames (1-2) suitably reinforced and connected to one another at the bottom part by two fixed cross members (3-4). The frame also has removable cross members (5,6,7) the ends of one of which supports the cross bars (5a) engaged so as to slide in the top profile of the frames (1 and 2), whereas the others have positioning notches (6a-7a) by clipping on the bars (5a). The cross member (5) with bars (5a) supports an edging guide (61). The assembly slides in the top profiles of the frames and two bars (30) screwed into the bars (5a) act as a table extension whose supports are made up of removable cross members (6-7). The bars (5a and 30) can be distributed both side of the table (FIG. 2) or positioned one side (FIG. 3) according to requirements.

Figure 5:
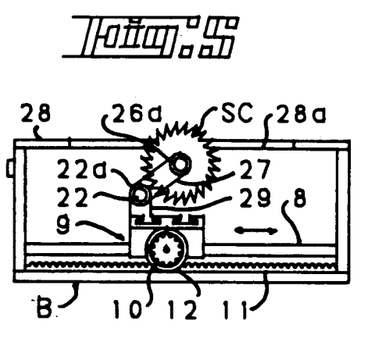
FIGS. 5, 6 and 7 are sections illustrating the saddle drive by pinion and rack, clutching lead screw and lever.
Figure 6:
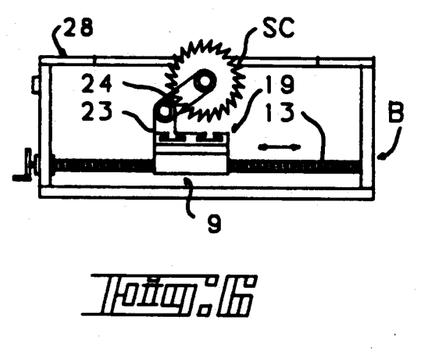
Figure 7:
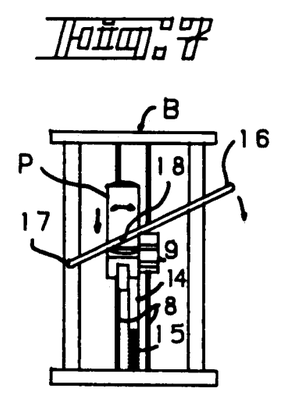

Parallel slides (8) are fixed between the frames (1 and 2) approximately in the middle part heightwise to provide guiding of a saddle (9) fitted in a known manner with translatory drive of the pinion (10) and rack (11) type with operating handwheel (12) (FIG. 5) or a clutching screw and nut drive (13) (FIG. 6) or even a lever (16) hinged in (17) on a fixed cross member and connected with play to (18) with the saddle (FIG. 7). With the frame in this vertical position, a sliding tube (14) is fixed to the saddle applied against a telescopic spring (15) in order to return the saddle into position. Obviously, it is possible to provide movements of the saddle by these various devices combined to one another, in order to achieve precise or approximate adjustment according to the machining operation concerned.

Figure 1:
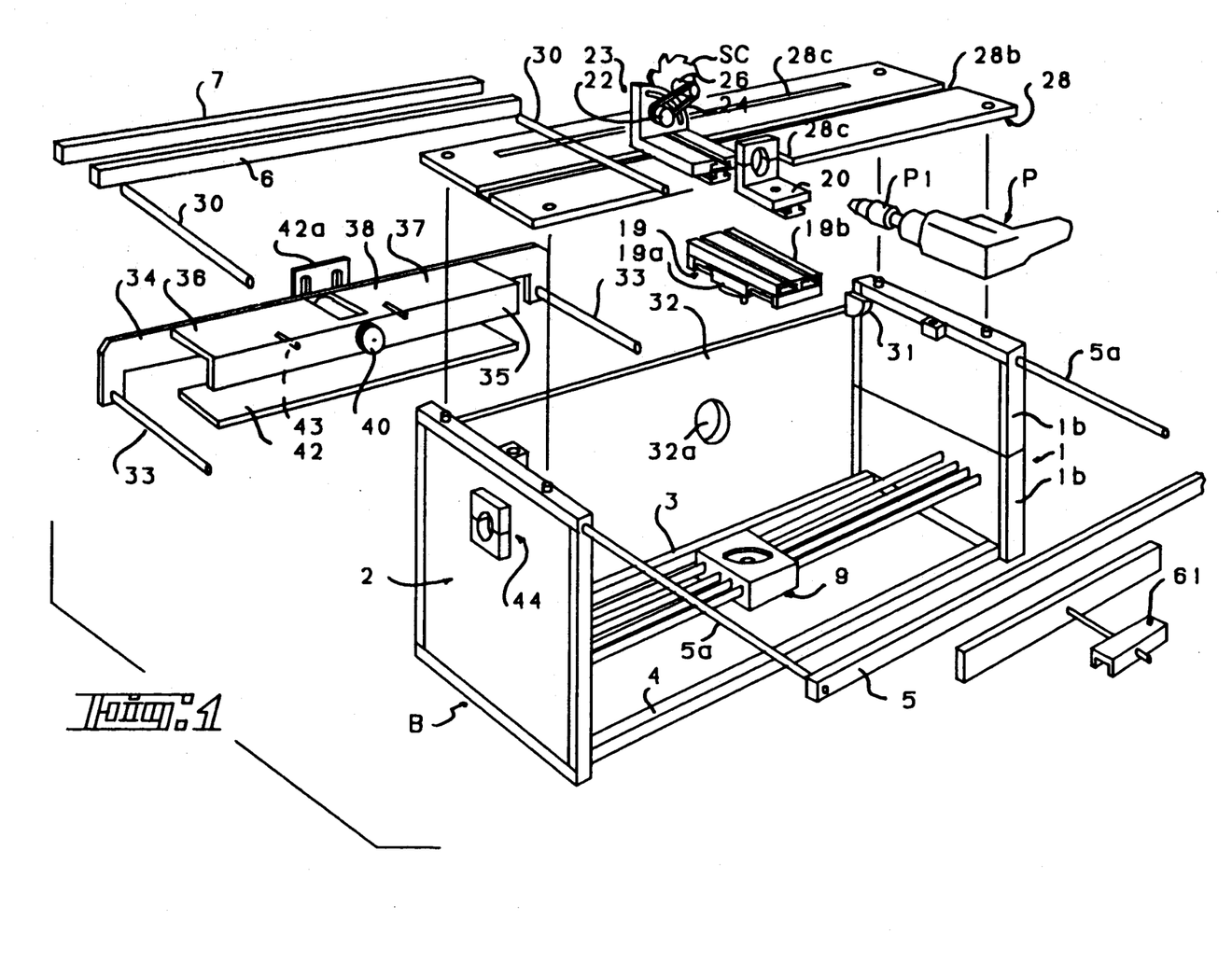
FIG. 1 is a perspective view separately illustrating the main components of the structure according to the invention.

The saddle (9) takes, in a swivelling manner and preferably with intermediate angular indexing positions, a cross slide (19) of the lathe slide type, i.e. formed of a base (19a) rotating with respect to the saddle and a cross slide (19b) adjustable in translation with respect to the base (FIG. 1).

The cross saddle (19a) is fitted so as to take by sliding, a square collar (20) to fix a motor which could be a portable drill (P), a motor block or a motor. The outlet shaft of the motor has, in a conventional manner, a drive device of the chuck (P1) type in which a rod (21) is locked and fixed to the end in order to cooperate angularly with a pin (22) mounted so as to freely turn on a square tool-holder (23) fixed so as to slide by its shoe (23a) on the cross slide (19a) (FIG. 8).

Figures 8, 9, 10, 11:
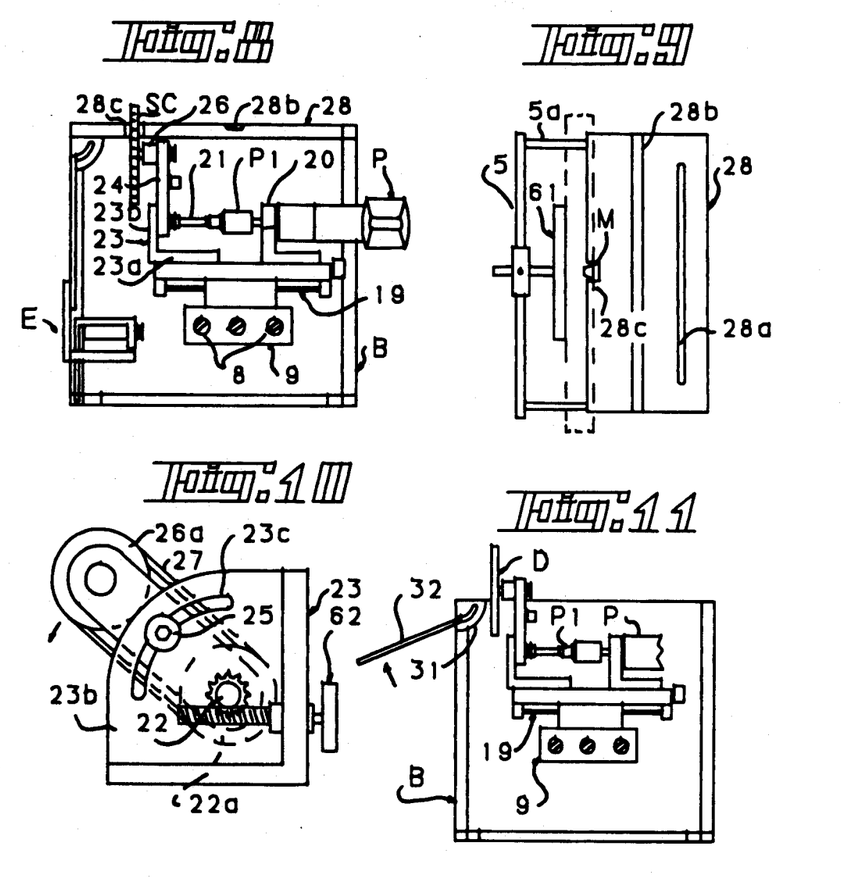
FIG. 8 is a section illustrating the saddle, slide and tool-holder assembly in particular.
FIG. 9 is a view showing the moulding position of the top table.
FIG. 10 is a view illustrating the angular adjustment of the tool-holder.
FIGS. 11 and 12 are views illustrating the sanding or sharpening position and grooving or horizontal drilling position respectively.

Concentrically to the pin (22) an arm (24) is mounted with backlash which can be swivelled with respect to the vertical leg (23b) of the tool-holder by a screw and rack drive (62) and locked in all positions between the horizontal and vertical positions of a screw and nut system (25) cooperating with a semi-circular slot (23c) of the leg (23b) whose radius has the pin (22) as a centre (FIG. 10).

The end of the arm (24) is mounted on a bearing so as to freely turn on a spindle (26) in order to fix the various tools either by a nose or expanding collet.

The spindle is turned by a pulley (22a-26a) and toothed belt (27) or gear drive (FIG. 10).

An upper table (28) fixed in any dismantable manner and according to several position on the frames, has a slit (28a) on the majority of its length in order for a circular saw (C) or other type to pass, the saw being mounted on the spindle (26) and a longitudinal groove (28b) for a swivelling cutting guide (29) and a side and middle cutout (28c) to pass a moulding tool (M) mounted on the spindle (26) (FIG. 9). The table (28) being positioned on the frame to function in one of the type of operations to be carried out.

Figure 4:
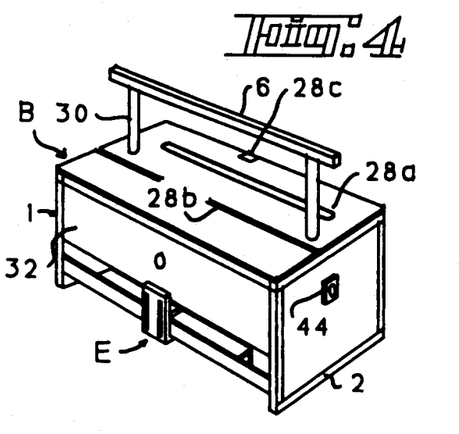
FIG. 4 is a perspective view of the structure in the transporting position.

The extensions (30) of the table can be screwed into vertical holes in the frames and connected by a cross member in order to make up a transporting handle for the structure (FIG. 4).

According to a characteristic, the bars (30) are associated with dismantable devices with the reference (DD) to fulfil several functions according to their adaptations as can be seen as follows.

Figure 24:
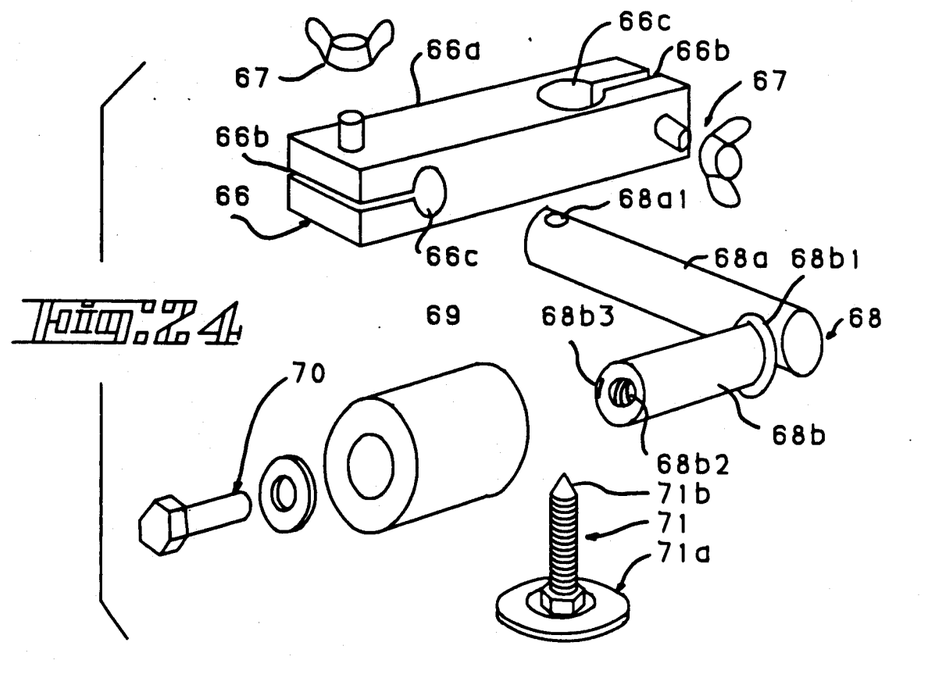
FIG. 24 is a perspective view separately illustrating the components comprising a multi-function device.

FIG. 24 illustrates the components of each multi-function device; a crossed collar (66) formed in a parallelepidedic block (66a) with two end slits (66b) orientated at 90°, both breaking through into two circular openings (66c) oriented in the same way. Each slit end is fitted with collar clamping screws and nuts (67) around cylindrical parts such as the bars (30) or the longest leg (68a) of a square with a cylindrical cross section (68) whose other leg (68b) is made up of a swivel pin for a roller (69) mounted so as to abut against a shoulder (68b1) and held in translation by a screw (70) engaged into a tapped end hole (68b2). Also seen in FIG. 24, an operating screw (71) with an oversized torquing head (71a) and cone point (71b) capable of being engaged in a tapped hole (68a1) made out transversally near the end of the leg (68a). This screw (71) can be advantageously one of the screws used to solidarise the bars (30) with the cross member (6 or 7) with a view to making up the transporting handle for the structure.

Figure 25:
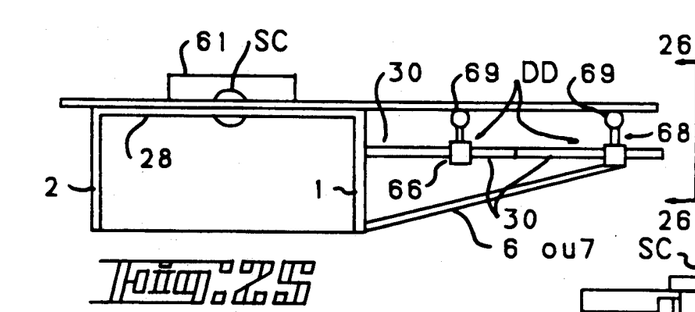
FIG. 25 is a schematic view showing the use of the device according to FIG. 24 as an extension of the sawing table on one side.
Figure 26:
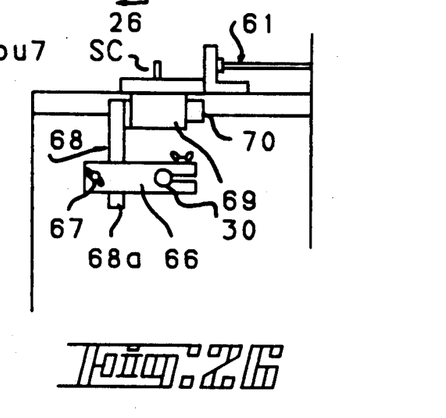
FIG. 26 is a side view taken along line 26—26 of FIG. 25.
Figure 27:
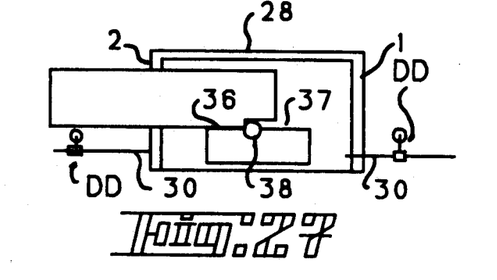
FIG. 27 is a schematic view showing the use of the device according to FIG. 24 as an extension of the planing table on both sides.

As seen in FIGS. 25 and 26, the devices (DD) can be mounted on one or several abutting bars (30) fixed externally to the frame (1 or 2) so that an extension of the sawing table can be formed in order to work on long and flexible parts which then rest on rollers (69) in line with the table (28). It is to be noted that a cross member (6 or 7) can be arranged as a brace between the frame (1 or 2) and a device (DD). A device (DD)-bar (30) can also be placed either side of the table, as shown in FIG. 27 where these assemblies are fixed to the frames so that the rollers (69) are in line with the semi-tables (36-37) of the straightening and planing machine.

Figure 28:
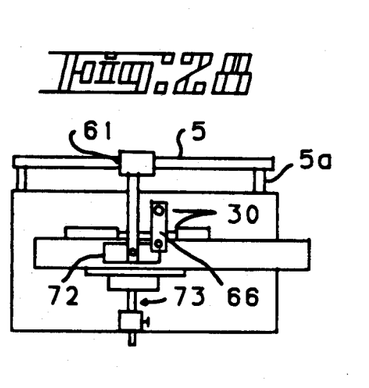
FIG. 28 is a schematic plan view illustrating the guiding and hold of the workpieces to be machined with the multi-function device associated to a hold down component.

According to another adaptation of the devices (DD) illustrated in FIG. 28, a bar (30) is vertically fixed on the support (23) with, for this purpose, tapped or smooth holes, this bar has a cross collar (66) mounted to it, then another bar (30) fixed horizontally on the said collar; the second bar is then connected to a second cross collar (66) which itself supports a hold down component (72) either to be pressed against the workpiece if it is fixed during the operation or to be only applied so as to slide with respect to the mobile workpiece during an operation. Another hold down or stopping component (73) can be placed opposite the edging support (61) in order to provide the locking or slided guiding of the workpiece during moulding operations.

Figure 29:
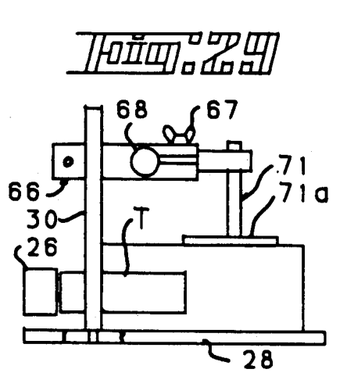
FIG. 29 is a partial section showing a multi-function device forming a screw jack or clamp for workpieces to be grooved for example.

In order to carry out grooving or routing operations with a tool (T) mounted on a spindle (26), two devices (DD) can be used, mounted on bars (30) integral to the table (28) and fixed so as to be in line with the frame, as shown in FIG. 29. In this case, the rollers (69) are removed so as to fix the bolt (68b) of the squares (68) in one of the openings (66c) of the collars according to a horizontal position and the operating screw (71) whose head (71a) can be pressed against the workpiece thus making up screw jacks, can be mounted on the other leg (68a).

Figure 30:
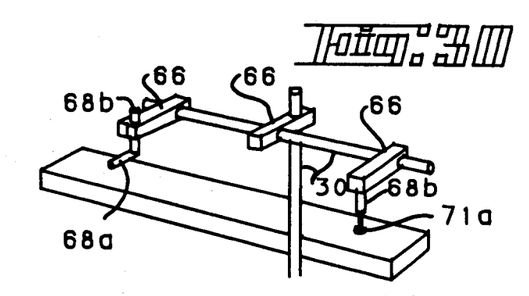
FIG. 30 is a perspective view illustrating multi-function devices combined so as to act as an anti-lifting stop for workpieces moved on the sawing table.

According to the embodiments illustrated in FIG. 30, a workpiece can be locked or stopped from lifting up accidentally by combining the different components of the devices (DD) and bars (30). For example, a bar (30) can be vertically fixed on the structure, a cross collar (66) on this bar, then a second bar (30) horizontally, supporting a cross collar (66) at each end with either a square (68) engaged by its leg (68b) and applied against its leg (68a) on the workpiece, or a square (68) engaged by its leg (68b) applied against the workpiece by the operating screw (71) mounted at the end.

The cutting guide (29) is made up of a support (29a) as a swivelling square on which slides a square (29b) enabling angular cuts to be made and used for rigid positioning with tenoning operations. The guide can be locked in order to cut off workpieces by moving the saw using the lever (16).

Figure 37:
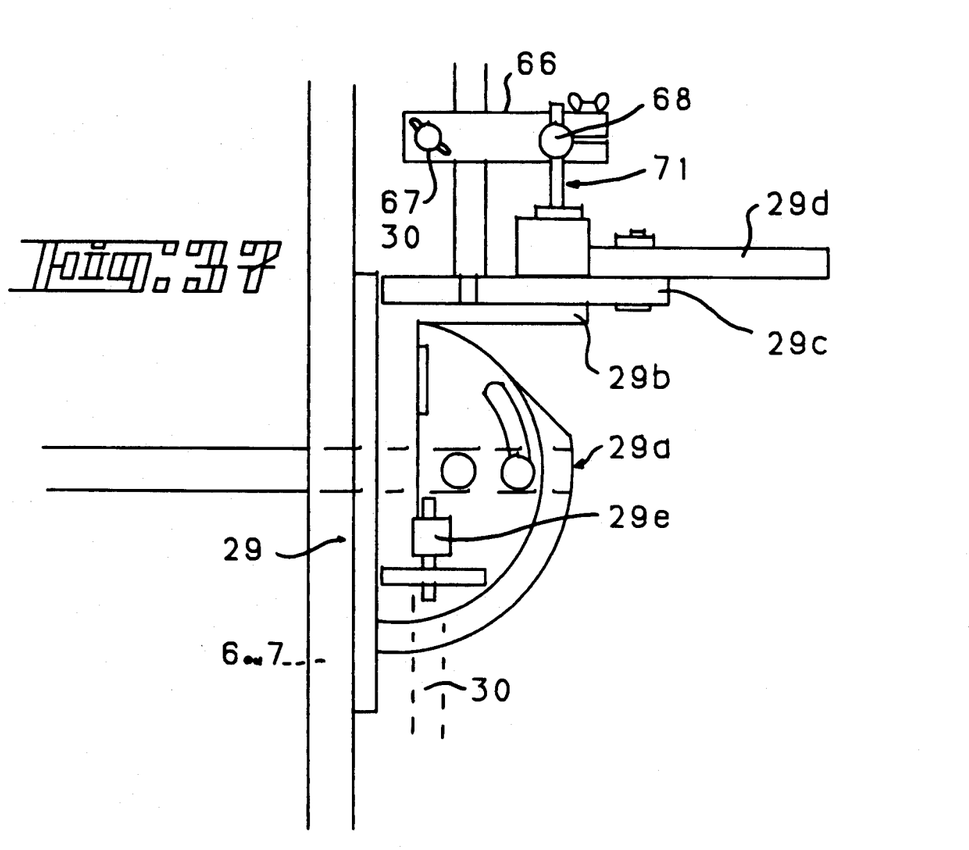
FIG. 37 is a partial plan view showing the equipment of the swivelling cutting guide with the multi-function device with a view to tenoning operations.

The sliding square (29b) takes a tenoning support (29c) supporting a protective casing (29d). The workpiece to be machined can be abutted against the said casing and be maintained by a multi-function device, i.e. by an operating screw (71) engaged in a square (68) which is supported by a cross collar (66) fixed onto a bar (30) itself connected to the support (29c), as seen in FIG. 37. It is to be noted that a cross member (6 or 7) can be fixed onto the guide (29) in order to extend the guiding and act as a stop with the edging support (61). Similarly, another bar (30) can be screwed onto a component (29e) of the adjusting device of the sliding square (29b) in order to make up a stop using a cross collar (66).

Figure 12:
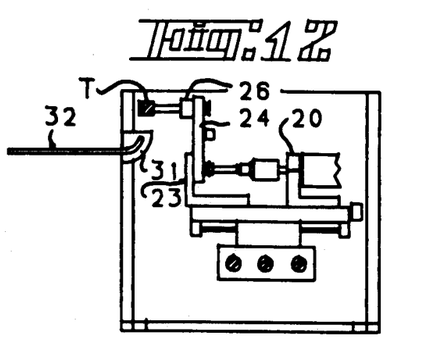
Figure 14:
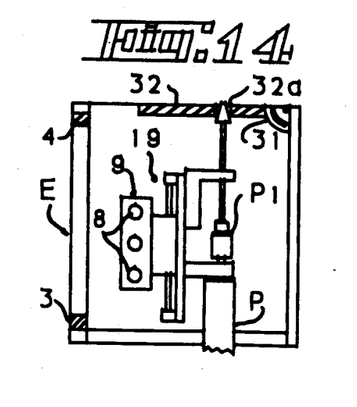
FIG. 14 is a section showing the routing position.

At the top part of the frames (1 and 2) and at the spindle (26) end, a plate (32) is hinged, according to two levels, preferably by adjusting and locking caliper (31), the said plate (32) making up an additional table, which, when it is in the top, horizontal or tilted position (FIG. 11), gives access to a tool of the sanding or sharpening disk type (D). It also acts as a protective casing and guide in the vertical position. When it is lifted horizontally and placed in the bottom position (FIG. 12), it enables horizontal drilling or grooving operations. In addition, it acts as a routing table and it has an opening (32a) for this purpose for a routing or moulding tool (T) to pass (FIG. 14) mounted on the motor with vertical swivel pin by 90° swivelling of the frame, only the motor projecting from the resting plane of the frame.

Figure 13:
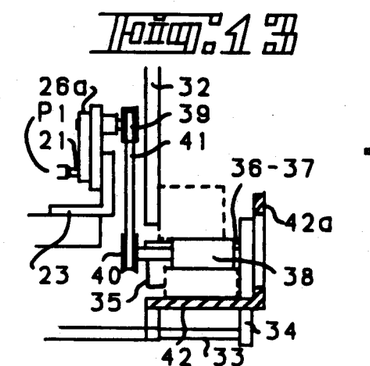
FIG. 13 is a section illustrating the straightening and planing assembly.

At the bottom part, the frames (1 and 2) are designed transversally in order to take so as to slide in a controlled manner, a straightening and planing assembly (E) forming both a straightening machine and planing machine disappearing inside the frame with a view to transporting. For this purpose, this assembly (FIGS. 1 and 13) comprises two mounting bars (33) in the frames (1 and 2) connected at the end by a front cross member (34) which, in combination with a rear cross member (35) and braces enables the positioning of the two semi-tables (36-37) offset in height, in an adjustable manner, in order to determine a depth of straightening cut by a rotary tool (38) mounted between the two cross members in the opening between the two semi-tables with the cutting circumference being tangential to the highest semi-table or outlet table. The tool (38) is rotated by the spindle (26) through a pulley (39-40) and toothed belt (41) drive.

The middle part of the front cross member (34) is designed so as to guide, in a height adjustable manner, a planing support (42) made up, for the purpose of a vertical lug (42a) for connection with the cross member and a horizontal table support (42b) for positioning the workpiece to be planed by the rotary tool (38).

Rolls (43) are mounted in rotation between the two cross members either side of the tool (38) with spring means to return in the direction of the workpiece to be planed, and a turning means of the handwheel or crank type is associated to one of the rolls to move the workpiece.

The frame (1) is preferably made in two separable parts (1b-1c). The top part (1b) can be removed (after dismantling the hinged caliper of the plate (32), in order to leave the passage for the motor (P) when the frame (B) is placed vertically (FIG. 6) for vertical or angular drilling or milling and routing operations. This part (1b) can then be fixed to the frame (2) in order to make up a drilling table extension.

As seen in the figures, the frame (2) is fitted with a clamping collar (44) for clamping and fixing outside the motor either directly or via the square support (20) fixed on a shoe.

For the turning operations between centres, a work driver (45) is mounted on the spindle (26) or chuck of the motor and a mobile rotary tailstock (46) is associated to the slides (8). The working capacity between centres can be increased by the slide extensions which can be advantageously made up by extensions (30) of the cross member (5) whose free end can be integral to the semi-part (1b) of the frame (1) in order to make up a rear support. For the chucking operations, the spindle (26) is fitted, either with a threaded nose, a work plate or a jaw type chuck.

Figure 15:
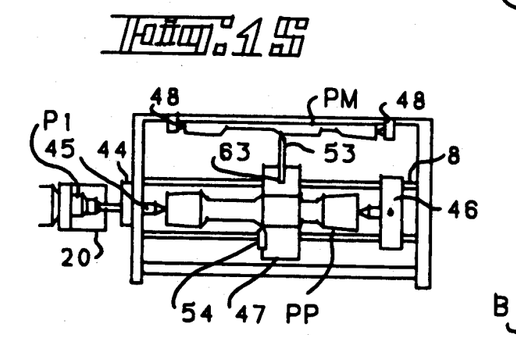
FIG. 15 is a section illustrating the turning position between centres with copying per pattern part.
Figure 16:
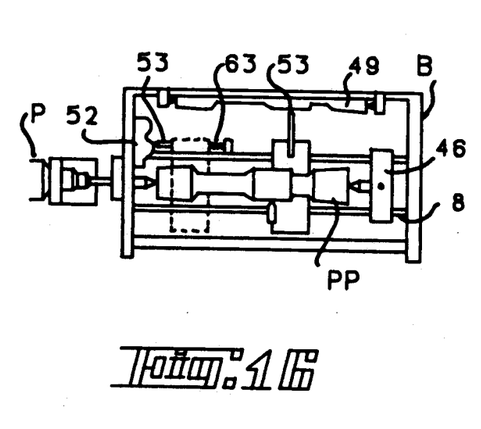
FIG. 16 is a view showing copying using a template.

Obviously, the chucking or tailstock operations are carried out with suitable tools then mounted on an adjustable turret (47) supported by the cross slide (19a). The saddle is moved longitudinally by the pinion and rack or nut and screw drive. The screw can be driven either manually by handwheel or automatically by connection to the drive with a reducing gear. For the copying lathe solution, the screw is replaced by a return spring of the slide. For longitudinal copying (FIG. 15), live centres (48) can be mounted so as to slide on the side member fixed to the frames (1 and 2) for positioning pattern parts (PM), or (FIG. 16) a plate type template (49) is clamped between two cross members fixed between the frames (1 and 2). For front copying (FIG. 16) a template support (52) can be positioned inside the frame (2). The sensor (53) is connected in a known manner to the cross slide (19a) which, due to its turret (47), supports the profiling tool (54) which can be moved against the workpiece to be profiled (PP) by an operating handle or a screw and nut system, after clutching out conventional controls. A spring (63) returns the saddle.

Figure 17:
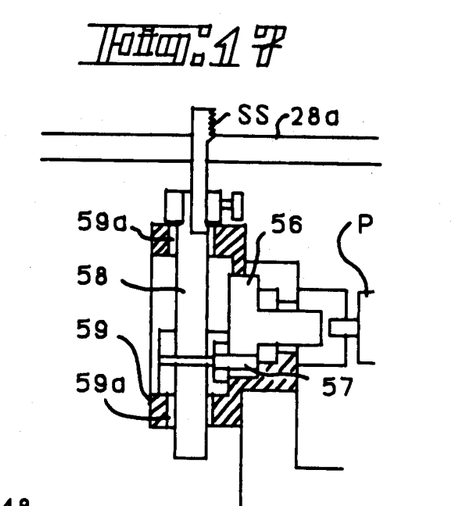
FIG. 17 is a section showing the drive adaptaption for a jig saw.

Another device (D) replacing the tool-holder (23) is provided to drive a reciprocating or swivelling jig saw (SS). For this purpose, different conventional means can be implemented to transform the rotating movement of the motor (P) into a reciprocating rectilinear movement of the saw. For example and as schematically illustrated in FIG. 17, the motor is angularly connected to a rotary plate (56) supporting a crank pin (57) on which a connecting rod (58) hinges, connected to the saw frame and guided so as to slide into a sleeve (59a) formed on a support body (59) integral to the square collar (20).

Figure 31:
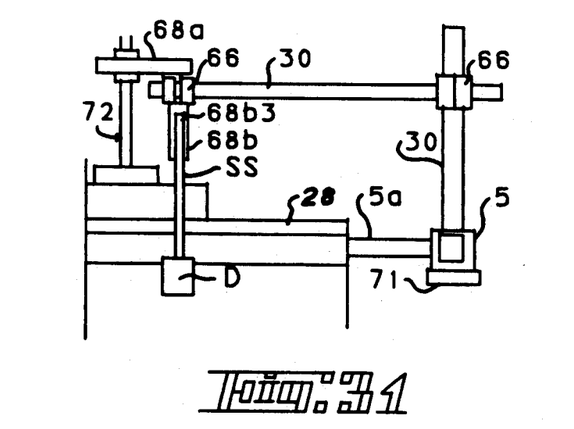
FIG. 31 is a side view illustrating the adaptation of a multi-function device for guiding a jig saw.

It is anticipated to guide the saw blade in its reciprocating movements. For this purpose, the multi-function device (DD) can be used as shown in FIG. 31. For this purpose, the table (28) or an extension cross member (5) is vertically fixed with a bar (30), cross collar (66) horizontally supporting a second bar (30) itself supporting a second cross collar (66) in which the leg (68b) of the square is engaged and fixed.

Part of the height of the said leg (68b) has a groove (68b3) which will be aligned with the blade of the saw in order to carry out guiding while preventing any twisting. A third cross collar (66) can then be fixed to the other leg (68a) to take a hold down component (72) preventing the part from lifting up.

Figure 32:
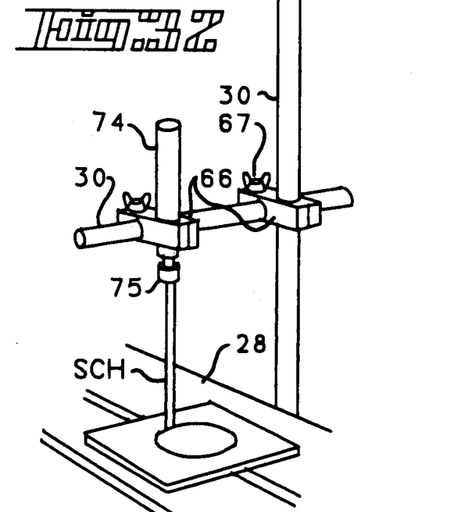
FIG. 32 is a partial perspective view showing the adaptation of a multi-function device to guide and assemble a pad saw.

A pad saw (SCH) can also be adapted to the connecting rod and crank pin drive mechanism. The saw's upper end is held by a bracket (64) with saw tensioning spring (65) (FIG. 18), or by a tube (74) provided with an internal spring and piston connected to the saw and operated by a bushing (75). The tube (74) is fixed in a cross collar (66) supported by a horizontal bar (30) itself connected to another cross collar (66) mounted on another bar (30) which is fixed to the structure (FIG. 32).

Figure 33:
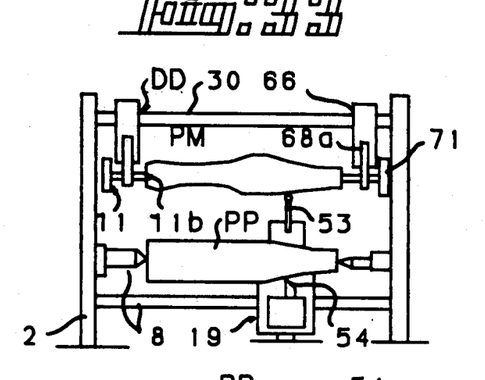
FIG. 33 is a partial plan view illustrating multi-function devices used to hold copying patterns between centres.

Multi-function devices (DD) can also be used to fix patterns to be copied between centres. For this purpose and illustrated in FIG. 33, one or several abutting bars (30) are fixed between the frames (1 and 2) of the structure. Two cross collars (66) are fixed horizontally on these bars and two squares (68) are mounted on the collars by their legs (68b) so that the other legs (68a) are perpendicular to the bars (30). The operating screws (71) are then engaged into the said legs (68a) so that their cone points (71b) are in front of one another and act as centering points for the pattern.

Figure 34:
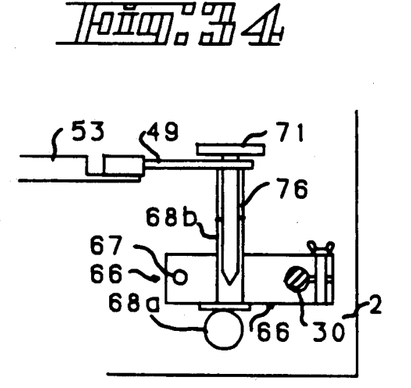
FIG. 34 is a partial section illustrating a multi-function device used to mount a copying template.

According to another embodiment illustrated in FIG. 34, the bars (30) are found fixed to the frames and supporting the cross collars (66). In this case, the squares (68) are engaged from bottom to top into the collars by their legs (68b) so that, through a brace (76), a sensor type (49) copying template (53) can be fixed via the operating screws (71).

The bars (30) and the cross collars (66) can also act as stops or adjustable guides in different operations thanks to the multiple fixing points of the tools (30) that are provided on the main components of the structure.

Figure 35:
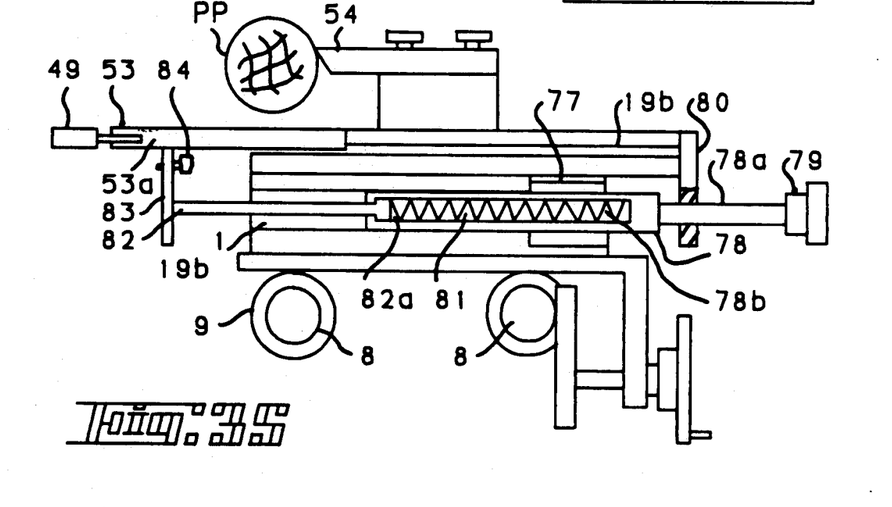
FIG. 35 is a cross section illustrating the crossed slide fitted with a device to mount a copying sensor applying constant pressure against the profile of the pattern or template.

According to another important characteristic implemented in order to improve the copying operations, a special connecting device is provided between the sensor (53) applying a pressure against a template or pattern part and the cross slide (19). For this purpose and as illustrated in FIG. 35, the top part (19b) of the slide has a bore (19b1) in which the rear end of the fixed nut (77) is inserted which is destined to cooperate with a screw (78) whose rear part (78a) is integral to a vernier (79) after passing through a bearing (80). The front part of the screw (78) has a bore breaking through into a side (78b) in which a helical spring (81) is engaged and applied between the bottom of the bore and the widened end (82a) of a rod (82) which is retained in the bore by any means such as lock seaming. The rod (82) is connected to a lug (83), itself integral to the rod (53a) of the sensor which is mounted, in an adjustable manner, on the top part (19b) of the slide. An adjustable stop (84) is provided between the lug (83) and the front face of the slide.

With this particular assembly, it is understood that once the sensor has been adjusted, the contact pressure remains constant between the sensor and the template or pattern part; when the slide is reversed, the tensioning adjustment is not modified.

Figure 36:
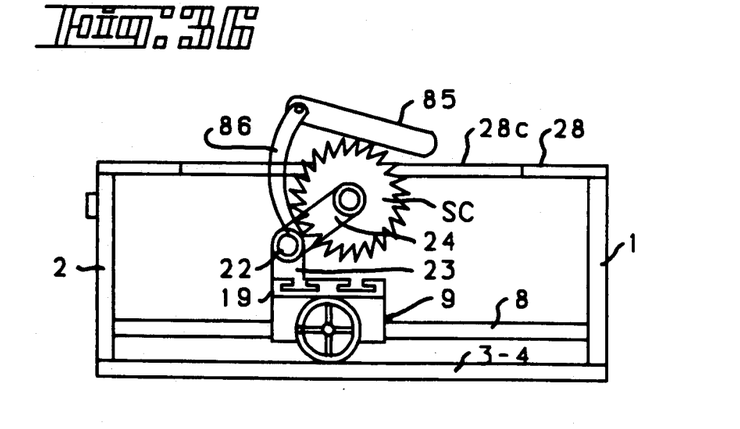
FIG. 36 is a schematic view illustrating the mounting of a protective casing of the circular saw.

According to another characteristic provided to reinforce the safety, the circular saw (SC) mounted on the swivelling arm (24) and spindle (26), is protected by a U-shaped casing (85) which rests on the front on the table (28) and is hinged at the rear to an indexing blade (86) mounted on the arm (24) in order to follow the movement of the saw (FIG. 36).

In order to multiply the working possibilities further and taking advantage of the fact that the structure has frames (1 and 2) forming a plate, one of these frames, frame (2) for example, was positioned with a clamping vice with parallel jaws (ES) in order to carry out cutting off, drilling, milling operations etc., with the motor (P) fixed onto the slide and moved in translation by all the previously described means.

Figures 21, 22, 23:
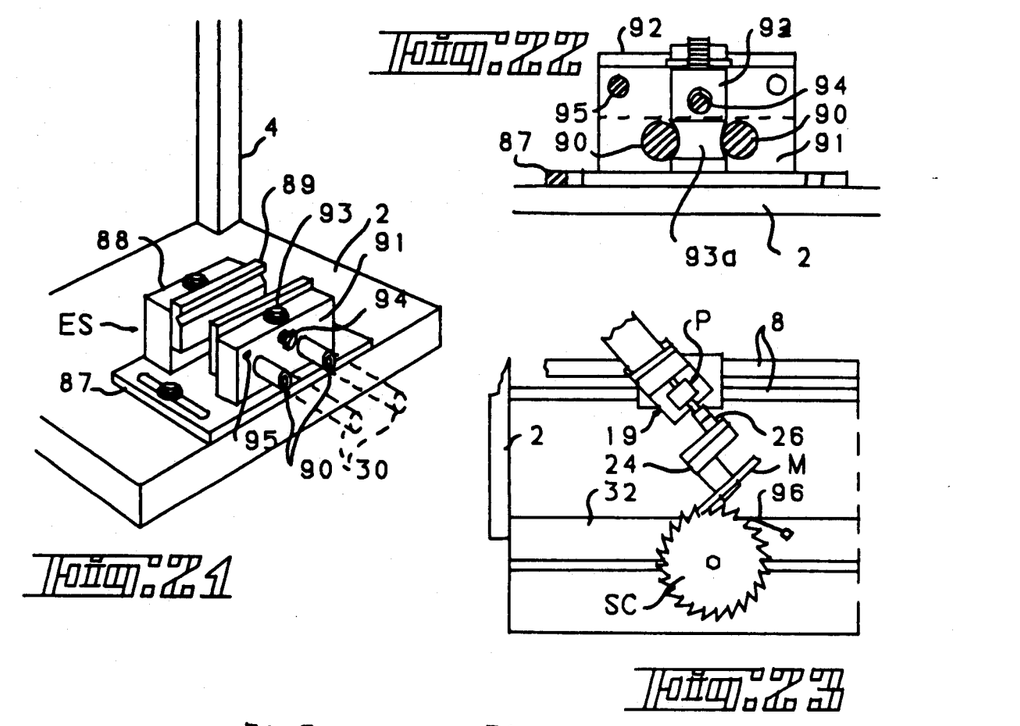
FIG. 21 is a partial perspective view illustrating a vice positioned on one of the frames of the structure.
FIG. 22 is a cross section of the vice according to FIG. 21.
FIG. 23 is a partial plan view showing an assembly for sharpening a circular saw.

This vice illustrated in FIGS. 21 and 22 is made up of a shoe (87) with adjustable fixing on the frame (2) and supporting a support block (88) for a fixed jaw (89). The bottom part of the block and under the fixed jaw there are parallel slides (90) which are perpendicularly fixed, these can have a support block (91) for a mobile jaw (92) moved on them. The support block (91) houses a bolt (93) for locking by means of its groove (93a) against the slides (90) by pulling upwards; the said bolt being indexed in rotation by a screw (94) crossing it and breaking through onto the front face of the block to ensure that the workpieces are fully clamped by the mobile jaw mounted and guided on the screws (95).

It is to be noted that the slides (90) have tapped ends in order to take the bars (30) to make up extensions.

It can also be seen in FIG. 23 that circular saws can be sharpened by positioning them on the table (32) lifted up and fixing on the spindle (26) connected to the motor (P), a suitable grinding wheel (M). A spring loaded stop (96) is placed between the field of motion of the saw in order to index it tooth by tooth.

Figure 38:
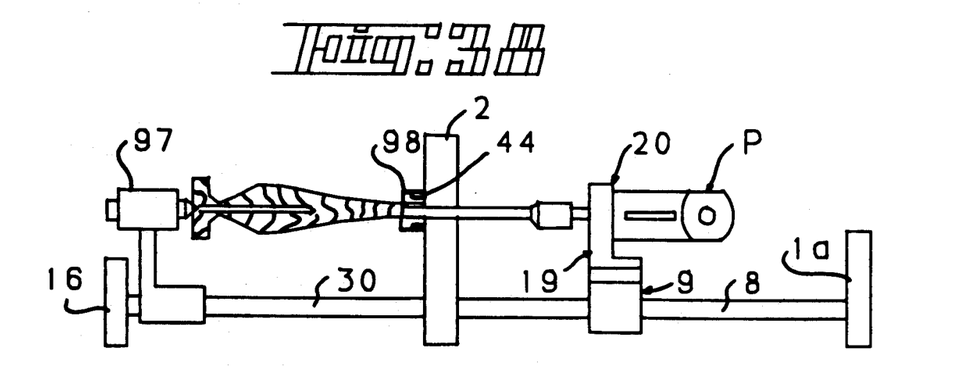
FIG. 38 is a partial section illustrating complementary equipment to carry out deep drilling operations with the motor fixed onto the crossed slide.

According to another implementation of the bars (30) illustrated in FIG. 38, it is possible to deeply drill openings with the motor (P) fixed on the slide (19).

For this purpose, the top part (1b) of the frame (1) is placed externally to the structure by connecting it to the frame (2) via the bars (30). A tailstock (97), is mounted on these bars in order to hold the workpiece to be drilled, the other end of which is centered in a bell (98) engaged into the fixing collar (44) of the motor and through which the drill passes. Thus the whole possible stroke of the slide is obtained in order to carry out drilling of blind holes directly or of breaking through holes by turning the workpiece over.

Figure 20:
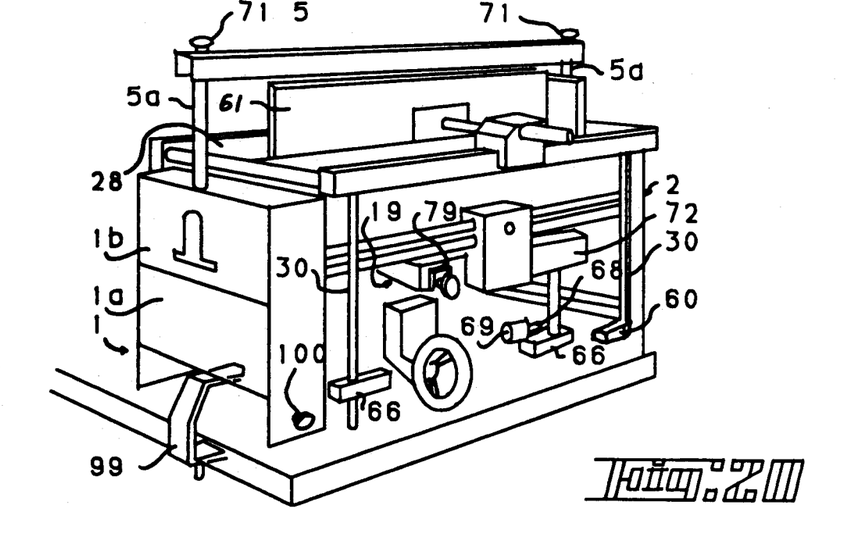
FIG. 20 is a perspective view of the versatile structure represented in the transporting position and clamped on a working surface.

As seen in FIG. 20, one or several disappearing type clamps (99) can be provided from the frames (1 and 2) in order to fix the structure onto any working surface and an emergency stop buttom (100) is placed in a very accessible area on the structure.

Figures 18, 19:
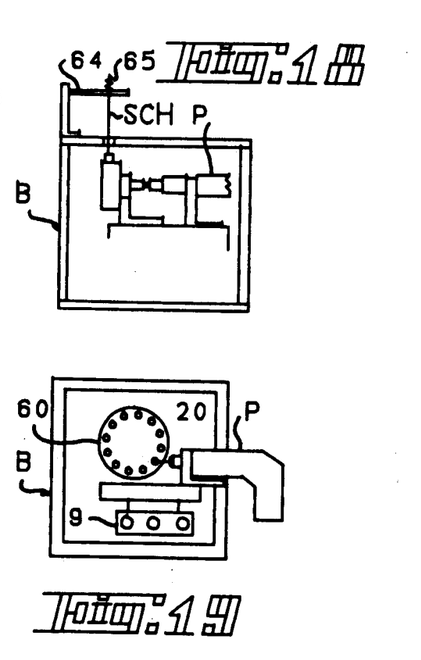
FIG. 18 is a section illustrating the adaptation for a pad saw.
FIG. 19 is a side view illustrating the adaptation of an index plate.

Finally, an indexing structure (60) indexed on the spindle (26) in position in the collar (44) and on the frame (2), can be adapted to carry out milling operations by reproduction with the frame in the horizontal position or milling or drilling with the frame in the vertical position (FIG. 19).

It is also to be noted that fixed or removable legs can be adapted under the frame and a storage area (drawer, tank, shelves etc) can be fitted into the frame to store accessories and tools.

The structure thus carried out according to the invention enables all the machining operations of soft materials such as wood, plastics, soft steels, light alloys, to be carried out.

Obviously, it is perfectly possible to design simplified versions from the basic structure if only some operations are desired.

For guiding purposes, the different operations possible with the approximate capacities for each are numbered below:

SAWING: 140 to 160 mm diameter blade or jig saw, cutting height 0 to 50 mm, table expanding up to 800 mm, maximum edging 800 mm.

STRAIGHTENING: carbide tipped tool 82 mm wide, maximum depth of cut 2 mm, semi-tables 80×450 mm.

PLANING: cutting width 82 mm, height 80 mm, max. depth of cut 2 mm.

ROUTING: with routing machine cutters chucked in collets, table 320×600 mm.

SLOTTING-GROOVING: diameter 13 mm, length 380 mm, depth 80 mm, table 270×600 mm.

PADDING: cutting height 60 mm, table 800×600 mm.

DRILLING:

(a) vertical: diameter 10 mm in steel, stroke 380 mm, drilling by tilting workpiece from 0° to 90°.

(b) horizontal: possibility of drilling by turning workpiece over, length 750 mm.

TURNING:

(a) woodworking lathe: max. dia on plate, 200 mm, between centres, 110 mm, max. length between centres, 900 mm.

(b) centre lathe: same capacities, longitudinal stroke 380 mm, transversal 80 mm.

(c) copying lathe: same capacities.

SANDING-SHARPENING: with disk diameter 125 mm on rigid plate and table 540×150 mm, tiltable from 0° to 90°.

VERTICAL MILLING: Clearance height under head 300 mm - index plate. Cross slide stroke 80×80 mm.

CUTTING OFF: slide moved by lever or pinion and rack assembly.

The advantages are clearly apparent from the description, the following is to be underlined in particular, the universality of the structure, its light weight and compact size enabling it to be easily transported anywhere particularly on work sites and in special residences. The versatile structure is quickly and easily implemented and can be used by both professionals (joiners, mock up artists, pattern makers, erectors, etc) as individuals. Its multiple varying alternatives of equipment from the basic structure means made-to-measure patterns can be offered to users: the numerous possibilities of use of the multi-function devices (DD) with the bars (30); the sensor applying a constant pressure against the template or pattern part by its elastic mounting on the cross slide; the vice with parallel jaws fixed onto the structure in order to carry out certain operations easily; the safety accessories (clamps, casings, emergency stop button, etc).

I claim:

1. A multi-purpose motorized tool holding structure for machining operations comprising a generally parallelepipedic stand means (B), said stand including two separated parallel frame means (1, 2), said frame means having bottom portions, two fixed transverses (3, 4), said frame means being connected at said bottom portion by said two fixed traverses, said frame means having parallel guide slide means (8) affixed therebetween substantially centrally of said frame means, a saddle means (9–19) slidably mounted on said guide means, a changeable tool carrier (23–47) and a rotary tool driving motor mounted on said saddle means (P) said tool driving motor operatively connected to rotatably drive said changeable tool carrier, whereby said changeable tool carrier may be used for different machining operations on various materials.

2. The multi-purpose structure according to claim 1, wherein the saddle means (9) has a carriage means (19) having a base (19a) which is rotatably mounted on the saddle means and includes a transversal carriage (19b), which can be regulated in translation relative to said base, carries in a controllable manner the changeable tool carrier (23) retaining means for the driving motor (P).

3. The multi-purpose structure according to claim 1, wherein another stand traverse (5) carries an edge-saw support (51) slidingly engaged upwardmost by said frames (1, 2).

4. The multi-purpose structure according to claim 1, wherein the stand means (b) is closed at its upper part by a table means (28) assembled in a manner which is removable relative to the frames (1, 2) and in accordance with several positions corresponding to various operations, and that this table possesses a longitudinal slot (28a) on its surface which slot permits the passage of a tool of the circular saw type (SC), saber saw or some other type of saw (SS) mounted on the changeable tool carrier (23), a lateral and median notch (28c) for the passage of a tool and a longitudinal groove (28b) for an adjustable cutting guide (29).

5. The multi-purpose structure according to claim 1, the frame means (1, 2) of the stand means (b) has an upper part (1b) and a lower part (1a), whereby the upper part (1b) is raised in order to permit passage for the rotary tool driving motor (P) in a vertical position of the stand means for operations of piercing or milling and that said part (1b) is then fixed to the other frame in order to constitute an extension of said table.

6. The multi-purpose structure according to claim 1, wherein a rotary translation device means (D) is mounted at the drive output of the rotary tool driving motor in order to transform the rotary movement supplied by the rotary tool driving motor (P) into a reciprocating, rectilinear movement to drive a saw.

7. The structure according to claim 1, wherein a vise with parallel clamping jaws (ES) is fixed on one of the frame means (1 or 2) the vise includes parallel slides (90) for controlling the movable jaws, whose extremities are designed to receive extension bars (30).

* * * * *